219-146.52 SR

XR RE 28,326 20 Q

X 3185 Q

Feb. 4, 1975 RE28,326

ARC WELDING ELECTRODE AND PROCESS FOR STAINLESS STEEL

Original Filed June 2, 1971

INVENTOR
ALBERT J. ZVANUT
BY HIS ATTORNEYS,
NILSSON, ROBBINS, WILLS & BERLINER

RE28326
OR IN 219/137R

United States Patent Office

Re. 28,326
Reissued Feb. 4, 1975

28,326

ARC WELDING ELECTRODE AND PROCESS FOR STAINLESS STEEL

Albert J. Zvanut, Whittier, Calif., assignor to Stoody Company

Original No. 3,670,135, dated June 13, 1972, Ser. No. 149,271, June 2, 1971, which is a continuation-in-part of Ser. No. 879,045, Nov. 24, 1969, now Patent No. 3,585,352, which is a continuation-in-part of Ser. No. 777,405, Nov. 20, 1968, now abandoned. Application for reissue May 20, 1974, Ser. No. 471,416
Int. Cl. B23k *9/00*
U.S. Cl. 219—137 38 Claims

Matter enclosed in heavy brackets [ ] appears in the original patent but forms no part of this reissue specification; matter printed in italics indicates the additions made by reissue.

ABSTRACT OF THE DISCLOSURE

There is disclosed an arc welding process for stainless steel and a flux-cored electrode particularly useful therein which is formulated of components having relatively low moisture absorptivity.

CROSS REFERENCE TO RELATED APPLICATION

This application is a continuation-in-part of copending application Ser. No. 879,045, filed Nov. 24, 1969, now U.S. Pat. No. 3,585,352, which is a continuation-in-part of application Ser. No. 777,405 filed Nov. 20, 1968, now abandoned.

FIELD OF THE INVENTION

The field of art to which the invention pertains includes the field of arc welding electrodes.

BACKGROUND AND SUMMARY OF THE INVENTION

Flux-cored electrodes have been utilized in the arc welding of steel for continuous or automatic feeding of the electrode to the work piece. Generally mild steel or low carbon steel (both more accurately termed plain steel) in tubular form is filled with a mixture of fluxing and slag forming agents and deoxiders to protect the weld against oxidation. Such "bare" electrodes permit direct electrical contact and, as the electrode is melted by the arc, the mixture of materials constituting the core function much in the same manner as if they were coated on the electrode or separately deposited. However, since the bare steel is exposed to the effects of the atmosphere, protective gases are invariably utilized to obtain a clean weld. Such gases as helium and argon are commonly utilized and bulky and expensive gas metering equipment is required; yet, arc welding with such electrodes in the absence of a protective gas cover results in pitted and rough welds, embrittled by entrapped oxides.

Prior attempts have been made of formulate bare electrodes that could be utilized in air, i.e., without the use of inert gas or auxiliary covering, as exemplified by the disclosures of U.S. Pat. Nos. 2,909,650 and 2,909,778. These methods have incorporated deoxiders (including "killing agents") along with the alloying metals and have included a fluxing agent, as "protector" for the more reactive deoxidizers, and a slag former as an oxide solvent. Typically, sufficient silicon dioxide is utilized to impart acidic properties to the slag. While these disclosures have added to the art, their techniques are not entirely satisfactory when applied to the welding of stainless steel.

It is not desired to limit the present invention to any particular theory since the chemistry and physics of welding are very complex; nevertheless some of the reasoning behind development of the present invention will help to indicate why the prior art has failed to develop adequate means for arc welding stainless steel in air with a flux-cored electrode. Perhaps one of the major reasons for this failure of development is that the prior art has not appreciated that there are very significant and critical differences between the chemistry of welding plain steel and the chemistry of welding stainless steel. For example, the art has theorized that one of the major reasons for weld porosity is the release of nitrogen gas, carried into the molten weld in the form of a nitride of a metal and formed upon reaction of the metal with the surface iron oxide. This explanation of porosity is quite satisfactory with plain steel welding in view of the relatively low solubility of nitrogen gas in plain molten steel. Accordingly, to "cure" this problem, the prior art adds a metal which forms a nitride of sufficient size as to sink into the molten weld pool where the amount of iron oxide present is less than on the surface, thereby avoiding the formation of nitrogen gas. However, when the same procedures are applied to the welding of stainless steel in which porosity is a problem, they are not successful, and it may be theorized that nitrogen gas is not responsible for porosity in stainless steel. The solubility of nitrogen gas, and therefor tolerance for the gas, is apparently much greater in stainless steel than it is in plain steel. Another distinction between stainless and plain steels results simply from the gas generating effects of the high carbon content of plain steel which causes the formation of blowholes.

It can thus be theorized that the reasons for the porosity in stainless steel are chemically different than the reasons for porosity in plain steel, and further theorized that the reasons relate to the relative insolubilization of hydrogen during solidification of stainless steel. Thus, hydrogen induced porosity apparently occurs when the residual hydrogen is supplemented by another source which raises the total amount of hydrogen above the solubility limit. When the hydrogen content of the weld exceeds the solubility limit for the conditions of temperature and solidification rate during welding, porosity occurs. This aspect of porosity is also of concern with plain steel, however, the problem is much more severe in stainless steels. In the presence of moisture, chromium apparently accelerates the reactions responsible for porosity. It can also be theorized that a major culprit which donates hydrogen to the weld is moisture. During manufacture, flux-cored electrodes are processed through a baking step which reduces the moisture to low levels. However, upon storage, the moisture content increases to the point where it results in porosity.

In my prior U.S. application Ser. No. 879,045, now U.S. Pat. No. 3,585,322, a process and electrode are provided which enable the arc welding of stainless steel without the formation of porous steel welds. In particular a flux cored electrode is utilized in which the filler components have relatively low moisture content and which incorporates calcium fluoride, or a fusion or decomposition derivative thereof, in specified amounts in accordance with the moisture content of the filler. By such means superior stainless steel welds are obtained even under open arc conditions.

The present invention provides other agents which, alone or in conjunction with the aforesaid calcium fluoride, operate to limit the effects of small amounts of moisture. In particular, I provide a process comprising providing an arc welding flux-cored electrode which is capable of forming a stainless steel weld of desired composition, electrically energizing the electrode, mechanically feeding the electrode toward the work piece while maintaining an arc between the end of the electrode and work piece, and providing moisture limiting means whereby the electrode is applied to the work piece with a moisture content of less than 1.0 percent based on the weight of the filler. The moisture limiting means relates to the composition of the electrode flux and to certain ratios of components of the electrode. A suitable electrode comprises a hollow tube of steel having as filler on the inside thereof (1) one or more alloying metals in amount sufficient to form a stainless steel weld of desired composition and (2) slag-forming material including a slag-forming first component and a derivative of a metal having an oxide form when molten different from the first component and soluble in the slag. The steel tube has a diameter of 0.045 to 0.30 inches, the weight ratio of the filler to the steel tube being 0.2/1 to 1.5/1 and the weight ratio of the slag-forming material to the alloying material being 0.15/1 to 0.65/1.

In accordance with this invention, as a means for limiting the moisture content, a fluoride or the fusion or decomposition derivative thereof, is included in the filler in at least an amount, corresponding to the level of moisture content of the filler, as will yield a non-porous weld, the fluoride comprising 5–100 percent of a compound selected from lithium fluoride, sodium fluoride, barium fluoride, magnesium fluoride, aluminum fluoride, potassium silicofluoride, sodium silicofluoride, and combinations thereof. The remaining fluoride, if any, can be any fluoride compound such as calcium fluoride. As will be illustrated herein further, the moisture content is defined by the line A–B of FIG. 2 in the accompanying drawing. While it is not desired to limit the invention to any particular theory, it may be theorized that the fluoride reacts with water vapor which may be present to form compounds which are not harmful to the weld. However, it may also be theorized that the fluoride compound increases the basicity of the slag which reduces hydrogen absorption by the weld metal. To further reduce the effect of moisture, the components of the slag-forming material of the filler are chosen so that this material, or fusion or decomposition derivative thereof, has a relatively low equilibrium moisture content, defined hereinafter as less than 2 weight percent at 70° F. and 90 percent relative humidity. To limit the tendency of the slag-forming material to take up moisture, it may be fused and formed into vitreous particles prior to incorporation into the steel tube.

With respect to specific compositions, the aforementioned derivative of metal has a basic or amphoteric oxide form when molten, different from the first slag-forming component, whereby the combination of the molten oxide form of the metal derivative and the molten form of the first component is basic or amphoteric. In still other particular embodiments, there is incorporated a second derivative of metal having a basic or amphoteric form which is similar in solubility properties to the first derivative of metal mentioned above.

DETAILED DESCRIPTION

Figure 1:
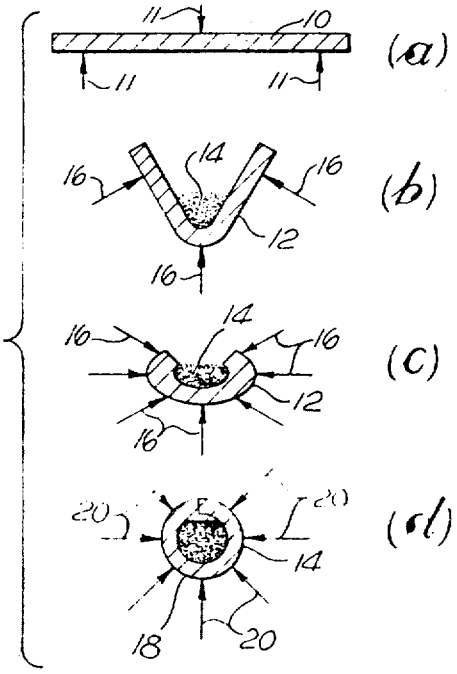
FIG. 1 is a series of cross-sectional views illustrative of a process of manufacturing welding electrode wire of the present invention.

The manufacture of an arc welding electrode of tubular construction enclosing a core composition of this invention is illustrated in FIG. 1. A flat strip of metal or tape 10 is first prepared, comprising a metal which may be cold formed and which is a desirable component of the finished wire electrode. For example, the strip 10 (FIG. 1a) may comprise mild steel tape 15/32 inch wide and 0.0095 inch thick. The initial step in forming the electrode involves developing the strip 10, as indicated by the arrows 11, into an elongate trough 12 (FIG. 1b) utilizing any of a variety of known techniques. After formation of the trough 12, a quantity of filler 14 of this invention, the composition of which will be described below, is dispensed into the length of the trough 12 by a continuous-feed process. Subsequently, the trough 12 is compressibly closed as indicated by the arrows 16 (FIGS. 1b and 1c) until the original strip 10 comprises a closed cylindrical tube 13 (FIG. 1d). The metal-working formation of the strip 10 into a closed tube 18 with the filler 14 therein may be performed in production, for example, as disclosed in U.S. Pat. Nos. 1,629,748 and 1,640,859, issued to W. F. Stoody.

As depicted in FIG. 1d, subsequent to the formation of the closed tube 18, additional radial (rolling applied) compressive forces are applied as indicated by the arrows 20 to thereby closely compact the filler 14 within the tube. This action reduces the diameter of the tube 18 to accomplish electrode wire of the desired size, intimately mates the components together and may reduce some of the particles. In this regard, reference can be made to U.S. Pat. No. 3,534,390 issued to M. D. Woods and A. J. Zvanut which notes that the combination of the foregoing manufacturing steps and the utilization of filler 14 of particles below a critical size, coupled with the employment of compressive radially-applied rolling forces on the preformed tube, enable the accomplishment of welding electrode wires having a diameter of 1/16 inch or even smaller.

In accomplishing such small diameter continuous electrode, the ingredients (excepting the mild steel strip 10), particularly the alloying metals, should be reduced to particles which would pass a 60 mesh screen. In formulating electrode wire of very small diameter, e.g., 1/16 inch, it would be preferred to reduce the particles so that they would pass a 150 mesh screen, more preferable a 200 mesh screen, and the number of particles which would then pass a 325 mesh screen should be reduced to 25 percent of the total weight of the filler 14. The resultant mixture can then be compacted, baked and then crushed to 20 mesh for tube loading.

In the foregoing manner, electrode wire having a diameter of 0.045 to 0.30 inches may be accomplished economically in a continuous production operation and containing a weight ratio of filler to tube of 0.2/1 to 1.5/1. As will be brought out hereinafter, by utilizing such diameter wire and filler ratio and a weight ratio of slag-forming material to alloying metal of 0.5/1 to 0.65/1, an electrode which is particularly suitable for the welding of stainless steel is thereby produced. I have further found taht in order to accomplish an arc welding electrode suitable for satisfactory welding of stainless steel, the electrode filler 14 should include slag-forming material including a slag-forming first component and a derivative of a metal having an oxide form when molten, different from the first component and soluble in the slag. Additionally, if the sheet meal 10 differs from the desired weld composition, one or more alloying metals are provided in amount sufficient to form a stainless steel weld of the desired composition.

With respect to the alloying metals, their nature depends, as indicated, on the composition of the sheet metal 10 utilized to form the electrode and the desired weld composition. If the sheet metal 10 is formed of stainless steel of desired weld composition, then no alloying components need be present. However, it is economical to use plain steel for the sheet metal 10 and incorporate alloying metals in the filler 14. The term "plain steel" is generically descriptive of a variety of steels ranging from low-carbon or mild-steel (typically 0.005 to 0.15 percent carbon content) to high-carbon steel (up to 1.0 percent carbon content) and any of such steels can be utilized as the steel strip 10. The compositions of this invention are formulated to obtain a stainless steel weld; accordingly, with plain steel sheet metal 10, the alloying metals should include at least 10 weight percent chromium. Other alloying metals include aluminum, molybdenum, nickel, titanium, tungsten, vanadium, zirconium, manganese, columbium, silicon, ferro alloys such as ferrochromium, ferrosilicon, ferrocolumbium, ferromanganese, ferromolybdenum, and the like, or any other alloying element or combination thereof added to impart a desired alloying effect to the stainless steel.

With regard to the slag-forming first component, such materials are well known to the art, such as titanium dioxide (e.g., in the form of rutile, or other natural form), alumina, silicon dioxide (e.g. in the form of silica flour, feldspar, wollastonite, and the like), manganese dioxide, mixtures of metal oxides, such as asbestos, and the like. Titanium dioxide is a particularly effective slag-former. Other slag-formers are known such as potassium titanate and may be utilized in the broadest sense of this invention where steps are taken to provide means for limiting the level of moisture in the electrode. However, as will be discussed in greater detail hereinafter, consideration relating to moisture absorption or adsorption may eliminate potassium titanate as a candidate. Sufficient total slag-former should be present to adequately cover the weld, generally from about 0.5 weight percent of the electrode as a minimum for the slag-former per se, up to about 15 weight percent total of slag-former and slag-soluble materials as hereinafter described.

With regard to the "derivative of metal" as hereinbefore mentioned, such material is chosen as has a basic or amphoteric oxide form when molten, which molten oxide form is soluble in the slag obtained during welding. One or more such "derivatives" may be utilized. Since the molten oxide forms of these derivatives are soluble in the slag, they should be chosen so as to not increase the density of the slag beyond that of the weld metal and also should be such, and be present in such amounts, as to impart to the combination of slag forming metal oxide and other slag-soluble components, at the temperature of weld formation, a freezing temperature no higher than the freezing temperature of the weld. In addition to melting point and density properties, viscosity and surface tension of the slag are also of prime importance (it is generally desired to have a slag of high viscosity and low surface tension). Accordingly, these factors should be balanced when blending the filler, and a combination of derivatives should be utilized which impart such characteristics or which allow such characteristics to be imparted by the addition of other agents.

The derivatives are preferably such as to yield basic or amphoteric oxides when molten, in contrast to the commonly used acidic oxide ingredients of the prior art, and are such that their molten combination with the slag-forming metal oxide and fluxing agent results in a basic or amphoteric slag. The terms "acidic," "basic" and "amphoteric" are well known to those in welding art; the classification can be made by noting any tendency on the part of the material to react with a strongly basic material like lime (in which case it would be acidic), or a decidedly acidic material like silica (in which case it would be basic or alkaline), or both in the case of amphoteric oxides. Generally the non-metals form acidic oxides and the metals form basic oxides (but particular members of Group IV and higher of the periodic table will often have basic, intermediate and acidic oxides, acid character generally increasing with the oxygen/metal ratio). It may also be advantageous to utilize a metal that is less "noble" than iron, i.e., that are more electro-positive than iron, to avoid any tendency of the derivative to oxidize iron.

With the foregoing parameters in mind, materials useful as derivatives can be chosen from such compounds as zinc oxide, barium oxide, calcium oxide, calcium carbonate, magnesium oxide, magnesium carbonate, cobalt (III) oxide, calcium oxalate, strontium oxide, titanium dioxide, manganese dioxide, potassium oxalate, lithium carbonate, zirconium carbonate, zirconium dioxide, gallium sesquioxide, and the like. Some of the foregoing derivatives were described above as slag-formers. In this regard the derivative chosen should be such as to be different from any slag-former utilized in the composition. Particularly effective results have been achieved with manganese dioxide as the sole derivative or in combination with zirconium dioxide or calcium carbonate. The amount of derivative suitably added is governed by factors already considered above, but generally from about 0.1 to about 3 weight percent, based on the electrode of each such material can be added.

In addition to the foregoing components, there may also be added as part of the filler a deoxidizer and a fluxing agent. With regard to the deoxidizer, this is added to dispose of oxygen or oxygen-bearing compounds in the molten weld, or to remain in the metal as a safeguard in the event that oxygen should enter. Accordingly, the deoxidizer is a metal having a greater affinity for oxygen than does iron so as to preferentially oxidize to thereby reduce iron oxide to iron. More than one deoxidizing metal may be present. Thus, the term "deoxidizers" as utilized herein includes also metals otherwise termed "killing agents." One can utilize such metals as chromium, tantalum, niobium, gallium, aluminum, silicon, calcium, lanthanum, manganese, vanadium, zirconium, berrylium, titanium, boron, barium, magnesium, strontium, lithium, actinium, and the like or alloys thereof such as ferrosilicon, ferrochromium, ferromanganese, and the like. It will be recognized that some of the foregoing deoxidizers were listed under alloying metals and, indeed, the same material can be utilized both as an alloying metal and deoxidizer, in which case sufficient metal in excess of the amounts required for deoxidizing purposes should be added to accomplish the alloying function thereof. Silicon, as such, or as a ferrosilicon is commonly utilized as a deoxidizer but the art has generally limited its inclusion to less than about 1 weight percent. In contrast, with the ingredients utilized for the filler 14 in accordance with this invention, particularly effective results are obtained utilizing effective (with regard to alloys such as ferrosilicon) amounts of silicon in excess of 1 percent, a particularly useful range being from about 1.1 to about 2 weight percent silicon. Lower amounts will still produce a very satisfactory result, albeit not as dramatic as the results obtained when the amount utilized is in the higher range. With regard to the amount of deoxidizer in general, from about 0.5 to about 2 weight percent of the electrode is generally satisfactory.

It should be noted that the high alloy content of stainless steel wires utilized in this invention can allow one to omit the use of elements, such as silicon, for de-oxidization purposes, since the high amount of chromium in stainless steel effects de-oxidization.

With regard to the fluxing agent, such materials are utilized to dissolve oxides formed during welding and it is in this function that the term "flux" is utilized here. The term "flux" has been utilized by the prior art to also indicate the function of mixing or co-mingling with an oxide to form a slag of more favorable melting point and viscosity; however, it is difficult in this respect to make a sharp distinction between shielding slags and fluxes, and for this reason the first-above meaning will be utilized. A wide variety of fluxing agents are known to the art, for example, calcium carbonate, calcium oxide (e.g., a calcined limestone), calcium fluoride (e.g., as fluorspar) and sodium oxide (e.g., as such, or as derived in situ from sodium carbonate or sodium silicate), and the like.

Further with respect to the nature of the components utilized herein, unless otherwise indicated, the materials are added in the form mentioned, but during processing may well be converted to another form in view of the conditions of processing. Also, it is advantageous to utilize only those components which at least in their finally processed form absorb or adsorb relatively low levels of moisture. Most of the slag-forming components of the filler are hygroscopic to some extent, but I have found that the level of moisture picked up by some components is quite a bit less than the level picked up by other components and that under certain test criteria, the distinction between suitable and non-suitable components can be demarcated.

Specifically, I have found that when various slag-forming materials are subjected to 90 percent relative humidity at 70° F. for a time sufficient to establish an equilibrium moisture content, those materials having an equilibrium moisture content of less than 2.0 weight percent yield satisfactory non-porous weld deposits, while those slag-forming materials having an equilibrium moisture content above 2 percent tend to yield porous weld deposits. Accordingly, it is preferred that each component chosen for the slag-forming material have an equilbrium moisture content under the aforementioned conditions of less than 2.0 weight percent, but satisfactory results are obtained if the resultant fully processed composition has that moisture level. The following example illustrates a method whereby the equilibrium moisture content for a variety of materials can be determined.

EXAMPLE 1

Approximately 7 grams of each of the materials listed were transferred as samples into pre-weighted aluminum dishes. The aluminum dishes were placed in an oven operating at 600° F. (or 1,800° F., as indicated) to drive off moisture content, and were removed, cooled and weighed at hourly intervals until a constant weight was reached (approximately 5 hours were needed). The aluminum dishes were then placed in a humidity chamber at 70° F. under 90 percent relative humidity and then weighed at 24 hour intervals until a maximum was reached or until 216 hours (which, experience has indicated, will indicate whether a material is suitable under the criteria set forth above). The moisture pickup of the sample was then calculated from the weight gain. The following results were obtained for a variety of materials.

| Material | Percent moisture pick-up |
|---|---|
| Zirconium silicate | 0.04 |
| Rutile | 0.06 |
| Calcium fluoride | 0.07 |
| Potassium silicofluoride | 0.07 |
| Mineralite | 0.19 |
| Feldspar | 0.20 |
| Manganese dioxide [2] | 0.35 |
| Zirconium dioxide | 0.58 |
| Clay | 0.99 |
| Potassium titanate [2] | 8.22 |
| Potassium oxlate | 11.6 |
| Bentonite | 15.4 |
| Sodium carbonate | 18.7 |
| Sodium silicate | [1] 163 |
| Potassium carbonate | [1] 156 |
| Potassium fluoride | [1] 254 |

[1] Deliquesced.
[2] Initial heating at 1,800° F.

Those materials having less than 2 weight percent moisture pick-up under the above conditions are thus readily determined and are particularly suitable as filler components. In addition to the materials listed in the table from zirconium silicate to clay, other suitable materials include lithium fluoride, sodium fluoride, barium fluoride, magnesium fluoride, aluminum fluoride, sodium silicofluoride, potassium oxide, calcium oxide and sodium oxide. Those components found to pick-up more than about 2 percent moisture should only be used if they are converted during processing of the electrode filler to a material having low moisture pick-up. For example, the carbonates of potassium, sodium and calcium can be used by incorporating one or more of these materials into the filler at such an early stage of processing that they are converted to the respective oxides which are not sufficiently hydroscopic to pick-up excessive amounts of water. This is also true of the oxalates. However, the carbonate or oxalate should not be added at a stage of processing in which it would be in a hydroscopic form, unless such small amounts are used that the total slag-forming material has an equilibrium moisture content, under the indicated conditions, of less than 2.0 weight percent.

Figure 2:
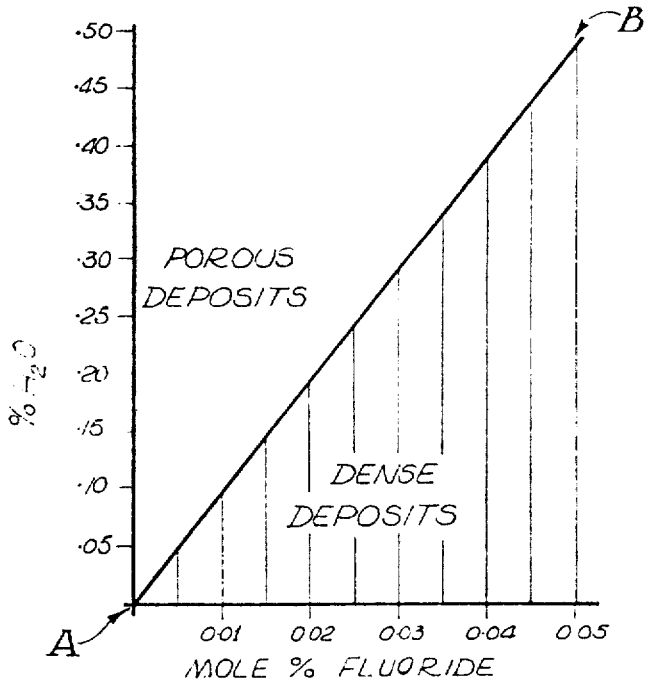
FIG. 2 is a chart illustrating the relationship of moisture content and fluoride content to porosity of weld deposit.

In accordance with the present invention, certain materials are added to the filler to impart beneficial effects to the electrode for welding stainless steel whereby a higher level of moisture content can be tolerated without producing porous welds. In particular, a level of fluoride is provided which serves a "gettering" function. The fluoride includes 5–100 percent of a compound selected from lithium fluoride, sodium fluoride, barium fluoride, magnesium fluoride, aluminum fluoride, potassium silicofluoride, sodium silicofluoride, or combinations thereof. The remaining fluoride, if any, can be any fluoride compound such as calcium fluoride. Referring to FIG. 2, this effect is graphically illustrated wherein the moisture content of the electrode filler is plotted against the level of fluoride, in moles per hundred grams of electrode, required to yield a dense, non-porous deposit. The amount of fluoride shown is in mole percent and is thus an "equivalent" amount. In this regard, the nature of the individual components of the filler can undergo drastic changes in chemical and physical structure during processing of the filler into the electrode, but the "equivalent" amount of any particular fluoride cation can be calculated from the amount of fluorine which remains. The levels indicated are, of course, approximate as FIG. 2 is intended to relate to a broad range of electrode compositions, but by operating in the region below the line A–B, one would generally obtain dense deposits with electrodes that would otherwise be unsuitable for welding stainless steel. Thus, one can readily obtain the benefit of this invention by analyzing the moisture content of his electrode just prior to use to determine the water content as a percentage of the electrode filler. He can then adjust the filler content to the appropriate levels indicated by the chart in FIG. 2. By way of example, if a particular electrode is found to yield porous deposits but is otherwise suitable for welding stainless steel, the moisture content of the filler can be analyzed and the appropriate fluoride level determined. If the amount of fluoride in the filler is lower than that indicated by the line A–B of FIG. 2, then sufficient fluoride as above listed can be added to the filler to correspond with the appropriate level as indicated by FIG. 2. It will then be found that the electrode yields dense, non-porous weld deposits.

As a further means for limiting the moisture content of the electrode. I have found that it is advantageous to fuse the slag-forming materials into vitreous particles prior to combination with the alloying metals. Thus, the raw slag and flux materials are formulated to achieve a desired theoretical melted composition after which the mixture is smelted in a continuous furnace. When a batch has achieved the desired molten state, it is water quenched, which operation yields a course granulated frit. The frit is then dried, ground and screened to the desired sizing as hereinbefore set forth. The alloying metals are then added and the mixture is formed into electrode wire in a manner previously described with respect to FIG. 1.

The following examples will illustrate these aspects of the invention.

EXAMPLE 2

An arc welding electrode can be formed as hereinbefore described with respect to FIG. 1, utilizing the following components, in percent by weight.

| Component | Percent of— Electrode | Slag mix |
|---|---|---|
| Chromium | 20.0 | ---------- |
| Nickel | 10.0 | ---------- |
| Manganese | 1.5 | ---------- |
| Ferrosilicon (85% Si) | 1.5 | ---------- |
| Rutile | 5.0 | 66.7 |
| Manganese dioxide | 1.0 | 13.3 |
| Barium fluoride | 1.0 | 13.3 |
| Zirconium dioxide | 0.5 | 6.7 |
| Mild steel strip | 59.5 | ---------- |

In accomplishing a continuous electrode from the above components, the ingredients (except the mild steel strip) are reduced, compacted and crushed as above. Subsequently, the ingredients are used as the filler material in conjunction with the mild steel strip which is cold formed into a containing tube. The structure is then compressibly reduced to 1/16 inch diameter by rolling forces.

The above electrode can be used in welding applications involving an inert gas (argon) treatment and in welding applications conducted in air, i.e., without the use of an inert gas cover. In both cases, satisfactory welds can be obtained.

EXAMPLE 3

Arc welding electrodes having 1/16 inch and 3/32 inch diameters can be prepared as in Example 2, but utilizing the following components in percent by weight.

| Component | Percent of– Electrode | Slag mix |
|---|---|---|
| Chromium | 20.5 | |
| Nickel | 8.8 | |
| Manganese | 1.5 | |
| Ferrosilicon (85% Si) | 1.5 | |
| Rutile | 6.0 | 63.2 |
| Zirconium oxide | 0.5 | 5.3 |
| Sodium fluoride | 2.0 | 21.0 |
| Manganese dioxide | 1.0 | 10.5 |
| Mild steel strip | 58.2 | |

As previously indicated, the mixture can be compacted, baked and crushed prior to tube loading. The formulated electrode wire can be used in welding applications conducted in argon and in air. In each case, satisfactory welds can be obtained.

EXAMPLES 4–7

In order to prevent the absorption or adsorption of water into the slag mix, frits can be prepared as hereinbefore described by the fusion and formation of the slag mix into vitreous particles. The raw batches formulated to obtain the frits can be as follows:

| | Example 4 | 5 | 6 | 7 | 8 |
|---|---|---|---|---|---|
| Compound, percent: | | | | | |
| Rutile | 52.0 | 56.1 | 51.8 | 55.1 | 53.10 |
| Lithium fluoride | 10.5 | | | | |
| Magnesium fluoride | | 21.0 | | | |
| Aluminum fluoride | | | 1.2 | | |
| Potassium | | | | | |
| Silicofluoride | | | | 22.0 | |
| Sodium | | | | | |
| Silicofluoride | | | | | 24.0 |
| Calcium fluoride | | | 24.1 | | |
| Manganese oxide | 12.8 | 11.2 | 11.2 | 11.2 | 11.2 |
| Potassium carbonate | 7.6 | 7.6 | 7.6 | 7.6 | 7.6 |
| Zirconium | 4.1 | 4.1 | 4.1 | 4.1 | 4.1 |
| Sodium carbonate | 4.0 | | | | |

After weighing, mixing and smelting and foregoing raw batch in a continuous furnace, and after the batch has achieved a molten state, it can be water quenched to yield a frit which is dried, ground and screened through a 200 mesh screen, and then further screened as hereinbefore described.

Arc welding electrodes having 1/16 inch diameter can be prepared as in Example 1 but utilizing the following components, in percent by weight.

| Component | Percent of electrode |
|---|---|
| Chromium | 20.0 |
| Nickel | 10.0 |
| Manganese | 1.5 |
| Ferrosilicon (85% Si) | 1.5 |
| Frit | 10.5 |
| Mild steel strip | 56.5 |

The electrodes can be used in welding applications in air, without the use of an inert gas, and satisfactory dense, non-porous welds can be obtained.

I claim:

1. A process for forming a stainless steel weld on a workpiece, comprising:

providing an arc welding electrode comprising a hollow tube of steel having as filler slag-forming material including a slag-forming first component and a derivative of a metal having an oxide form when molten different from said first component and soluble in said slag, said electrode being formulated with one or more alloying metals in amount sufficient to form a stainless weld of desired composition, *said slag-forming material being fused into vitreous particles prior to incorporation into said steel tube;* said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;

electrically energizing said electrode; and mechanically feeding said electrode toward said workpiece while maintaining an arc between the end of the electrode and the workpiece;

the components of said filler being chosen so that said filler, or fusion or decomposition derivative thereof, has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.

[2. The invention according to claim 1 in which said slag-forming material is fused into vitreous particles prior to incorporation into said steel tube.]

3. The invention according to claim 1 in which said fluoride comprises from 95 to 0 weight percent calcium fluoride.

4. The invention according to claim 1 in which said metal derivative has a basic or amphoteric molten oxide form, the combination of the molten oxide from said metal derivative and the molten form of said slag-forming component being basic or amphoteric.

5. The invention according to claim 1 in which said filler includes an additional derivative of a metal, different from said first mentioned derivative of metal, having a basic or amphoteric oxide form when molten whereby to impart to said slag-forming material, at the temperature of weld formation, a freezing temperature no higher than the freezing temperature of said weld, and whereby the molten form of said slag-forming material is basic or amphoteric.

6. The invention according to claim 1 in which said slag-forming first component comprises titanium dioxide and said metal derivative comprises manganese dioxide.

7. The invention according to claim 1 in which said slag-forming first component comprises titanium dioxide and said metal derivative comprises zirconium dioxide.

8. The invention according to claim 6 in which said filler includes zirconium dioxide as an additional metal derivative.

9. The invention according to claim 6 in which said filler includes calcium carbonate as an additional metal derivative.

10. An arc welding electrode comprising a hollow tube of steel, said electrode being formulated with one or more alloying metals in amount sufficient to form a stainless steel weld of desired composition, said tube having as filler:

slag-forming material including a slag-forming first component and, as a second component, a derivative of metal having an oxide form when molten different from said first component and soluble in said slag, *said slag-forming material being fused into vitreous particles;* said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;

the components of said filler being chosen so that said filler, or fusion or decomposition derivative thereof has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.

[11. The invention according to claim 10 in which said slag-forming material is fused into vitreous particles.]

12. The invention according to claim 10 in which said metal derivative has a basic or amphoteric molten oxide form, the combination of the molten oxide from said metal derivative and the molten form of said slag-forming component being basic or amphoteric.

13. The invention according to claim 10 including an additional derivative of a metal, different from said first mentioned derivative of metal, having a basic or amphoteric oxide form when molten whereby to impart to said slag-forming material, at the temperature of weld formation, a freezing temperature no higher than the freezing temperature of said weld, and whereby the molten form of said slag-forming material is basic or amphoteric.

14. The invention according to claim 10 in which said slag-forming first component comprises titanium dioxide and said metal derivative comprises manganese dioxide.

15. The invention according to claim 10 in which said slag-forming first component comprises titanium dioxide and said metal derivative comprises zirconium dioxide.

16. The invention according to claim 14 including zirconium dioxide as an additional metal derivative.

17. The invention according to claim 14 including calcium carbonate as an additional metal derivative.

18. The invention according to claim 10 in which said fluoride comprises from 95 to 0 weight percent calcium fluoride.

*19. A process for forming a stainless steel weld on a workpiece, comprising:*

*providing an arc welding electrode comprising a hollow tube of steel having as filler from about 0.5 to about 15 weight percent of slag-forming material including (a) a slag-forming first component selected from the group consisting essentially of alumina, silica flour, feldspar, wollastonite, manganese dioxide and asbestos and (b) titanium dioxide as a second component, said electrode being formulated with one or more alloying metals in amount sufficient to form a stainless weld of desired composition, said alloying metals including chromium in an amount comprising at least 10 weight percent of said electrode.*

*said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanically feeding said electrode toward said workpiece while maintaining an arc between the end of the electrode and the workpiece;*

*the components of said filler being chosen so that said filler, or fusion or decomposition derivative thereof, has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.*

*20. The invention according to claim 19 in which said slag-forming material is fused into vitreous particles prior to incorporation into said steel tube.*

*21. The invention according to claim 19 in which said fluoride comprises from 95 to 0 weight percent calcium fluoride.*

*22. The invention according to claim 19 in which there is at least 0.5 weight percent of said slag-forming first component and at least 0.1 weight percent of said titanium dioxide.*

*23. A process for forming a stainless steel weld on a workpiece, comprising:*

*providing an arc welding electrode comprising a hollow tube of steel having as filler from about 0.5 to about 15 weight percent of slag-forming material including (a) a slag-forming first component selected from the group consisting essentially of alumina, silica flour, feldspar, wollastonite, manganese dioxide and asbestos and (b) titanium dioxide as a second component, said electrode being formulated with one or more alloying metals in amount sufficient to form a stainless weld of desired composition, said alloying metals including chromium in an amount comprising at least 10 weight percent of said electrode and an effective amount of nickel;*

*said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanically feeding said electrode toward said workpiece while maintaining an arc between the end of the electrode and the workpiece;*

*the components of said filler being chosen so that said filler, or fusion or decomposition derivative thereof, has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.*

*24. The invention according to claim 23 in which an effective amount of manganese is included as an alloying metal.*

*25. The invention according to claim 23 in which at least 0.5 weight percent of a ferrosilicon is included in said filler.*

*26. A process for forming a stainless steel weld on a workpiece, comprising:*

*providing an arc welding electrode comprising a hollow tube of steel having as filler about 0.5 to about 15 weight percent of slag-forming material including (a) a slag-forming first component selected from the group consisting essentially of alumina, silica flour, feldspar, wollastonite, manganese dioxide and asbestos and (b) titanium dioxide as a second component, said electrode being formulated with one or more alloying metals in amount sufficient to form a stainless weld of desired composition, said alloying metals including chromium in an amount comprising at least 10 weight percent of said electrode and effective amounts of nickel and manganese.*

*said steel tube having a diameter of 0.045 to 0.30 inches,*

*the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanically feeding said electrode toward said workpiece while maintaining an arc between the end of the electrode and the workpiece;*

*the components of said filler being chosen so that said filler, or fusion or decomposition derivative thereof, has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of sodium fluoride,*

*said filler including at least 0.5 weight percent, based on said electrode, of a ferrosilicon.*

*27. A process for forming a stainless steel weld on a workpiece, comprising:*

*providing an arc welding electrode comprising a hollow tube of steel having as filler from about 0.5 to about 15 weight percent of slag-forming material including (a) a slag-forming first component selected from the group consisting essentially of alumina, silica flour, feldspar, wollastonite, managanese dioxide and asbestos and (b)* titanium dioxide as a second *component, said electrode being formulated with one or more alloying metals in amount sufficient to form a stainless weld of desired composition, said alloying metals including chromium in an amount comprising at least 10 weight percent of said electrode and effective amounts of nickel and managanese;*

*said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanically feeding said electrode toward said workpiece while maintaining an arc between the end of the electrode and the workpiece;*

*the components of said filler being chosen so that said filler, or fusion or decomposition derivative thereof, has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a fluoride combination comprising aluminum fluoride;*

*said filler including at least 0.5 weight percent, based on said electrode, of a ferrosilicon.*

*28. A process for forming a stainless steel weld on a workpiece, comprising:*

*providing an arc welding electrode comprising a hollow tube of steel having as filler slag-forming material including at least 0.5 weight percent titanium dioxide and at least 0.1 weight percent managanese dioxide, said electrode being formulated with one or more alloying metals in amounts sufficient to form a stainless weld of desired composition;*

*said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanically feeding said electrode toward said workpiece while maintaining an arc between the end of the electrode and the workpiece;*

*the components of said filler being chosen so that said filler, or fusion or decomposition derivative thereof, has an equilibrium moisture content of 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.*

*29. A process for forming a stainless steel weld on a workpiece, comprising:*

*providing an arc welding electrode comprising a hollow tube of steel having as filler slag-forming material including at least 0.5 weight percent titanium dioxide and at least 0.1 weight percent zirconium dioxide, said electrode being formulated with one or more alloying metals in amount sufficient to form a stainless weld of desired composition;*

*said steel tube having a diameter of 0.045 to 0.30 inches, the weight ratio of said filler to said steel tube being 0.2/1 to 1.5/1 and the weight ratio of said slag-forming material to said alloying metals being 0.15/1 to 0.65/1;*

*electrically energizing said electrode; and*

*mechanicaly feeding said electrode toward said workpiece while maintaining an arc between the end of the electrode and the workpiece;*

*the components of said filler being chosen so that said filler, or fusion or decomposition derivatives thereof, has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.*

*30. An arc welding electrode comprising a hollow tube of steel, said electrode being formulated with one or more alloying metals in amounts sufficient to form a stainless steel weld of desired composition, said alloying metals including chromium in an amount comprising at least 10 weight percent of said electrode, said tube having as filler:*

*slag-forming material including (a) a slag-forming first component selected from the group consisting essentially of alumina, silica flour, feldspar, wollastonite, manganese dioxide and asbestos and (b) titanium dioxide as a second component,*

*said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;*

*the components of said filler being chosen so that said filler, or fusion or decomposition derivative thereof has an equilibrium moisture content at 70° F. and 90 percent relative humidity of less than 2.0 weight percent;*

*said filler including a fluoride, or a fusion or decomposition derivative thereof, in at least an amount corresponding to the level of moisture content of said filler as defined by the line A–B of FIG. 2 in the accompanying drawing, said fluoride comprising*

5–100 weight percent of a compound selected from lithium fluoride, sodium fluoride, barium fluoride, magnesium fluoride, aluminum fluoride, potassium silicofluoride, sodium silicofluoride, and combinations thereof.

31. The invention according to claim 30 in which said slag-forming material is fused into vitreous particles.

32. The invention according to claim 30 in which there is at least 0.5 weight percent of said slag-forming first component and at least 0.1 weight percent of said titanium dioxide.

33. An arc welding electrode comprising a hollow tube of steel, said electrode being formulated with one or more alloying metals in amount sufficient to form a stainless steel weld of desired composition, said alloying metals including chromium in an amount comprising at least 10 weight percent of said electrode and an effective amount of nickel, said tube having as filler:

slag-forming material including (a) a slag-forming first component selected from the group consisting essentially of alumina, silica flour, feldspar, wollastonite, manganese dioxide and asbestos and (b) titanium dioxide as a second component;

said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;

the components of said filler being chosen so that said filler, or fusion or decomposition derivative thereof has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.

34. The invention according to claim 33 including an effective amount of manganese as an alloying metal.

35. The invention according to claim 34 wherein said filler includes at least 0.5 weight percent of a ferrosilicon.

36. An arc welding electrode comprising a hollow tube of steel, said electrode being formulated with one or more alloying metals in amount sufficient to form a stainless steel weld of desired composition, said alloying metals including chromium in an amount comprising at least 10 weight percent of said electrode and effective amounts of nickel and manganese, said tube having as filler:

slag-forming material including a slag-forming first component selected from the group consisting essentially of alumina, silica flour, feldspar, wollastonite, manganese dioxide and asbestos and (b) titanium dioxide as a second component;

said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;

the components of said filler being chosen so that said filler, or fusion or decomposition derivative thereof has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a fluoride combination comprising aluminum fluoride;

said filler including at least 0.5 weight percent, based on said electrode, of a ferrosilicon.

37. An arc welding electrode comprising a hollow tube of steel, said electrode being formulated with one or more alloying metals in amount sufficient to form a stainless steel weld of desired composition, said tube having as filler:

slag-forming material including at least 0.5 weight percent titanium dioxide and at least 0.1 weight percent manganese dioxide;

said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;

the components of said filler being chosen so that said filler, or fusion or decomposition derivative thereof has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.

38. The invention according to claim 37 in which said filler includes at least 0.1 weight percent, based on said electrode of zirconium dioxide.

39. An arc welding electrode comprising a hollow tube of steel, said electrode being formulated with one or more alloying metals in amount sufficient to form a stainless steel weld of desired composition, said tube having as filler:

slag-forming material including at least 0.5 weight percent titanium dioxide and at least 0.1 weight percent zirconium dioxide;

said steel tube having a diameter of 0.045 to 0.30 inches, the weight ratio of said filler to said steel tube being 0.2/1 to 1.5/1 and the weight ratio of said slag-forming to said alloying metals being 0.15/1 to 0.65/1;

the components of said filler being chosen so that said filler, or fusion or decomposition derivative thereof has an equilibrium moisture content at 70° F. and 90 percent relative humidity of less than 2.0 weight percent;

said filler including a fluoride, or a fusion or decomposition derivative thereof, in at least an amount corresponding to the level of moisture content of said filler as defined by the line A–B of FIG. 2 in the accompanying drawing, said fluoride comprising 5–100 weight percent of a compound selected from lithium fluoride, sodium fluoride, barium fluoride, magnesium fluoride, aluminum fluoride, potassium silicofluoride, sodium silicofluoride, and combinations thereof.

40. A tubular composite self-shielded arc welding electrode comprising a metallic outer sheath and a core within and enclosed by the sheath, the electrode containing chromium and nickel in sum in an amount equal to at least 29.3 weight percent of the weight of the electrode whereby to produce a high-alloy deposit of chromium-nickel stainless steel, the core comprising 16.67 percent to 60 percent of the electrode weight and consisting essentially of the following listed components in the specified weight percentages of the electrode; from about 1 percent to about 7 percent of a slag-forming material fused into vitreous particles including a slag-forming first component and a derivative of a metal having an oxide form when molten different from said first component and

*soluble in the slag, from 1.0–2.67 percent of fluoride comprising 5–100 weight percent of a compound selected from lithium fluoride, sodium fluoride, barium fluoride, magnesium fluoride, aluminum fluoride potassium silicofluoride, sodium silicofluoride, and combinations thereof, 1.5 percent manganese, from 1.1 to 2 percent silicon, and from 10 to 30 percent of other metal-bearing materials selected from the group consisting of metals, metal alloys and ferroalloys.*

No references cited.

JOSEPH V. TRUHE, Primary Examiner

G. R. PETERSON, Assistant Examiner

U.S. Cl. X.R.

219—146